United States Patent [19]
Jobin et al.

[11] Patent Number: 5,301,456
[45] Date of Patent: Apr. 12, 1994

[54] PORTABLE LUMINOUS INSECT TRAP

[76] Inventors: Luc Jobin, 2925, rue Summerside, Sainte Foy, Quebec, Canada, G1W 2E9; Charles Coulombe, 161, chemin Saint Helène, St. Joseph de Levis, Quebec, Canada, G6V 6N4

[21] Appl. No.: 935,911

[22] Filed: Aug. 27, 1992

[30] Foreign Application Priority Data

Aug. 29, 1991 [CA] Canada .................... 2,050,234

[51] Int. Cl.⁵ .............................................. A01M 1/04
[52] U.S. Cl. ...................................................... 43/113
[58] Field of Search ................... 43/113, 139, 141, 119, 43/112

[56] References Cited

U.S. PATENT DOCUMENTS

| | | | |
|---|---|---|---|
| 618,450 | 1/1899 | Worrell | 43/113 |
| 681,772 | 9/1901 | Wright | 43/113 |
| 952,659 | 3/1910 | Young | 43/113 |
| 967,883 | 8/1910 | Crabtree | 43/113 |
| 983,468 | 2/1911 | Wood | 43/113 |
| 988,476 | 4/1911 | Baum | 43/113 |
| 1,819,551 | 8/1931 | Gourdon | 43/113 |
| 3,201,893 | 8/1965 | Gesmar | 43/113 |
| 3,465,468 | 9/1969 | Takamoto | 43/113 |

*Primary Examiner*—Kurt C. Rowan

[57] ABSTRACT

The invention relates to a portable luminous trap for flying or crawling insects. A fluorescent lamp in the center of an insect ingress zone attracts the insects. Transparent baffles radiating outwardly from the lamp act as walls and an insect hitting a baffle is stunned and drops downwardly, through a funnel opening into an entrapment container therebelow. The funnel also helps prevent escape of still-living insects from the container. An alkaline dry cell battery powers the lamp, test circuits for the battery and the lamp, and a clock circuit. A photocell is used to activate the trap at dusk and the setting for the clock circuit determines the length of time that the lamp is activated each night.

13 Claims, 6 Drawing Sheets

5,301,456

PORTABLE LUMINOUS INSECT TRAP

The present invention relates in general to insect traps and in particular to versatile luminous insect traps having extensive control capabilities.

BACKGROUND OF THE INVENTION

Insect traps are well known and many different varieties have been manufactured for many years. Insect traps generally are used for two purposes, to trap and kill large quantities of harmful and/or annoying insects such as mosquitoes, or to trap smaller quantities for entomological surveys to determine the presence, abundance and emergence of many useful or economically important insect species. Samples taken over a particular time period give trained observers an indication of insect populations and rates of growth or decline of such populations. Live samples are also sometimes required for research purposes. Insect traps can be used to control populations by trapping sexually active members of the insect population attracted to the trap by suitable lures or attractants, such as pheromones.

As indicated above there are many styles of insect traps, including those found in Belton's Canadian Patent No. 1,227,929 of Oct. 13, 1987; Brown's Canadian Patent No. 525,188 of May 22, 1956; Boisvert et al's U.S. Pat. No. 4,501,088 of Feb. 26, 1985; Jobin et al's U.S. Pat. No. 4,642,936 of Feb. 17, 1987; and Koike's U.S. Pat. No. 2,095,986 of Oct. 19, 1937. These traps illustrate many different features, including the use of light as an attractant, the use of restricted entrances to the trap, the use of restrictions to prevent escape, the use of protective covers, the use of pheromones as the attractant, the use of toxins to kill trapped insects, and the use of variable luminosity to attract different insects. While each of these traps adequately performs its desired functions it cannot be said that they are readily adaptable to trapping many varieties of insects, that they are readily controllable so that they can be left for long periods of time without attention, or that they are efficient in permitting easy access to the trap while preventing easy egress therefrom when it is desired to keep the trapped insects alive.

SUMMARY OF THE INVENTION

The present invention overcomes the problems of the prior art by providing an insect trap that uses a luminous attractant in combination with an electrical control circuit that minimizes energy usage by keeping the attractant energized for only a predetermined length of time each night. The preferred power source for the insect trap of this invention is a 6 volt alkaline lantern battery, providing up to 38 days of operation for four hours each night. The luminous attractant is a replaceable miniature tubular lamp, preferably fluorescent, energizable by the battery. Any one of a range of coloured lamps can be used depending on the insect(s) that are of interest. Lamps emitting white, green, blue, or U.V. (ultra violet) light are available and can be used in this invention.

The trap of this invention includes an upper housing that contains the battery and the control circuitry. An ingress section is located below the housing and the tubular lamp is centrally positioned therein. A removable entrapment container is provided below the ingress section to capture the trapped insects, the container including an inwardly directed funnel at the top thereof for directing the trapped insects downwardly into the container and for making it difficult for the trapped insects to escape from the container.

The present invention utilizes a plurality of inwardly directed transparent plastic baffle members within the ingress section. These baffle members extend from adjacent the outer periphery of the ingress section to adjacent the tubular lamp. Adjacent pairs of baffle members define an insect ingress zone. Flying insects attracted to the lamp do not perceive the baffle members and are stunned when they hit the baffle members. The stunned insects drop onto the funnel and are directed thereby into the entrapment container.

Since the inner edge of each baffle member lies adjacent the tubular lamp light therefrom will be transmitted into the baffle members by refraction, causing a glowing appearance and thereby enhancing the attraction of the lamp. The enhanced luminescence provided by the baffle members means that the lamp can be operated close to the threshold voltage with a minimum battery drain.

The present invention incorporates various other features. For example, the control circuitry can include testing and indicating portions that will ascertain whether the battery and/or the lamp are in satisfactory operating condition. The circuitry will include a photocell for turning the power on at dusk and a clock for turning the power off at a later time. If desired, the clock can be set to turn off the power at any selected time, preferably at multiples of one hour after the power is turned on. There will be an oscillator and a transformer for providing the necessary starting voltage for the fluorescent lamp. The photocell can be connected to a low pass filter so that it will not be tricked into turning the power off by momentary illuminations such as might result from lightning or flashlights. Additionally, it would be possible to combine the luminous attractant with other lures or attractants, such as pheromones or phosphorescent pigments, depending on the desired use of the trap. Other features and options will be described hereinbelow.

In summary therefore, the present invention may be considered as providing a trap for flying or crawling insects comprising: upper housing means; a frustoconical, outwardly projecting protective roof member at a lower end of the housing means; an insect ingress section connected to the housing means below the roof member; a removable insect entrapment container connected to the ingress section therebelow; a frustoconical funnel member within the container at an upper end thereof so as to open downwardly into the container; electrical power and circuit means within the housing means for supplying electrical power to a removable light source centrally positioned within the ingress section; and a plurality of spaced apart transparent baffle members within the ingress section, each baffle member extending vertically above the funnel member from adjacent the outer periphery of the ingress section to adjacent the light source, with each pair of adjacent baffle members defining an insect ingress zone.

DESCRIPTION OF THE PREFERRED EMBODIMENT

Figure 1:
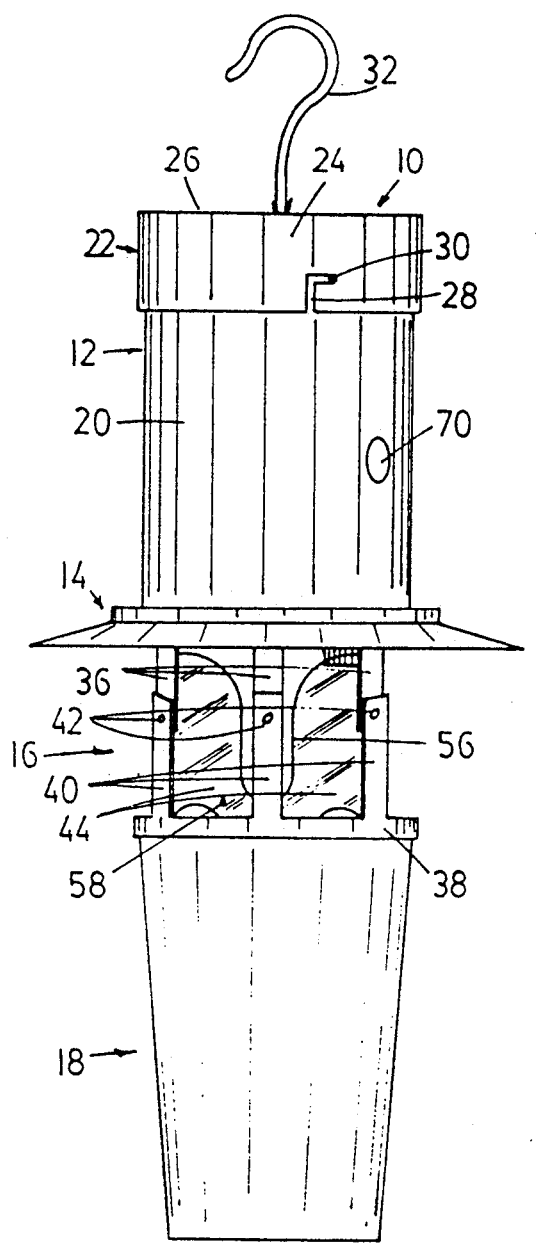
FIG. 1 is an elevational view of the insect trap of the present invention.
Figure 2:
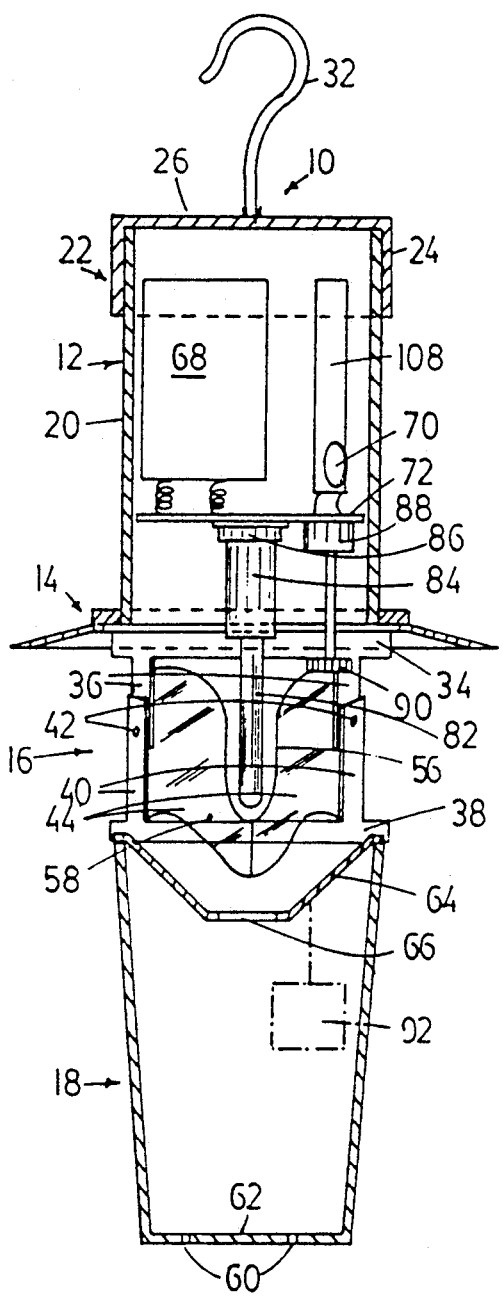
FIG. 2 is a partial vertical section through the trap of FIG. 1.

FIGS. 1 and 2 illustrate the structure of the luminous insect trap 10 of the present invention. It will be seen that the trap includes, generally, an upper housing section or means 12, a protective roof member 14, an insect ingress section 16, and a lower entrapment container 18. These components, and other components located therewithin, will be described hereinbelow.

The upper housing means 12 includes an annular cylindrical casing or housing 20 open at each end. A cup-shaped cap member 22 fits over one end of the casing 20 to close it off, the cap member having cylindrical side wall 24 and circular end wall 26. Inverted L-shaped slots 28 in the side wall 24 cooperate with radially directed pins 30 on the casing 20 to effect a bayonet-type locking of the cap member to the casing 20. A suitable hook member 32 is provided on the cap member 22 for suspending the trap from a suitable support, such as a tree branch.

The lower end of casing 20 mounts the frustoconical, radially outwardly projecting roof member 14 that protects the components therebelow from rain, or other falling debris.

Figure 3:
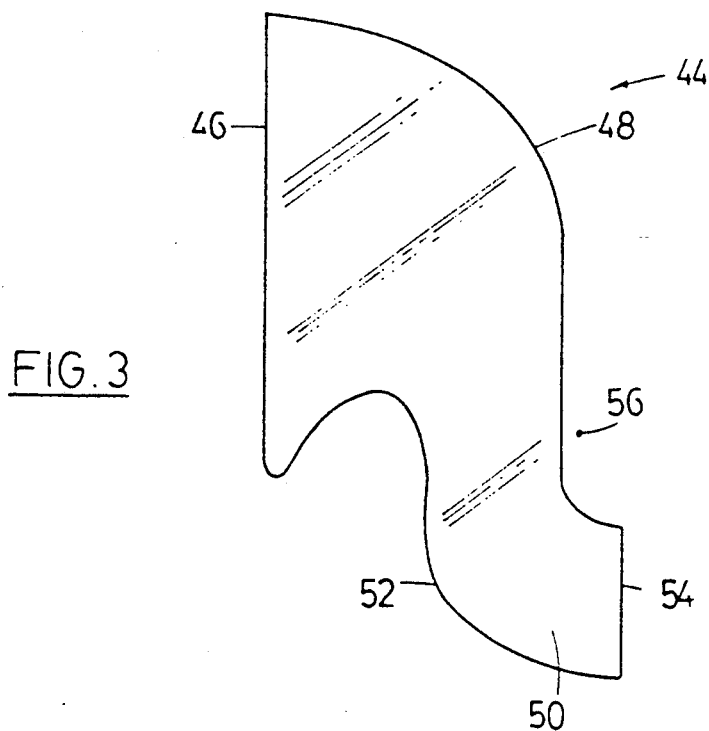
FIG. 3 is an elevational view of a baffle member as used in this invention.
Figure 5:
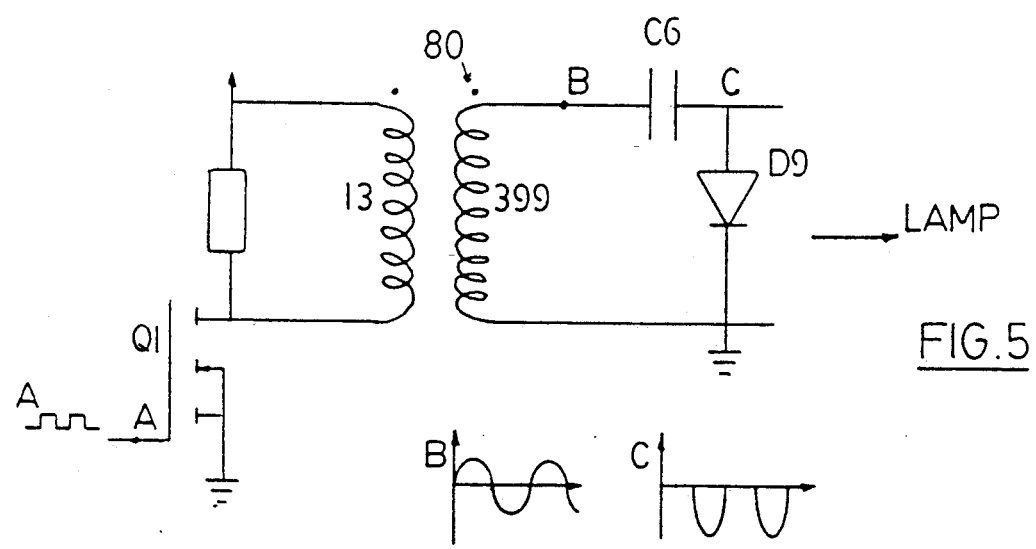
FIG. 5 shows the transformer circuit of the invention.
Figure 9:
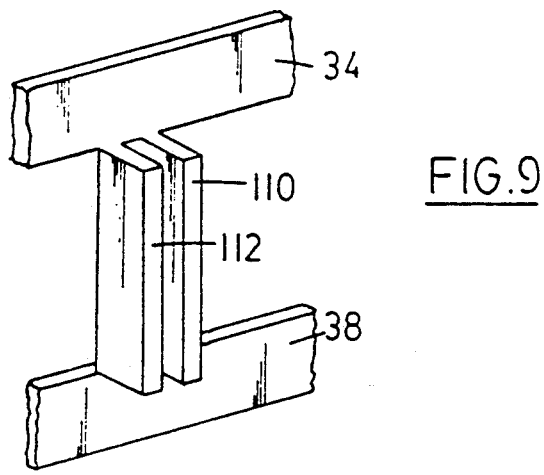
FIG. 9 shows an alternate construction for the ingress section.

The ingress section 16 is the area through which insects attracted to the trap actually enter the trap. In the embodiment illustrated the ingress section includes an upper peripheral rim 34 from which depends a plurality of spaced apart tabs 36, and a lower peripheral rim 38 from which a plurality of elongated tabs 40 extends upwardly, each tab 40 being connected to a corresponding tab 36 by a connecting screw 42. Alternatively, the upper rim 34 could be connected to lower rim 34 by continuous ribs 110 (FIG. 9), each of which has an inwardly directed slot 112. The ingress section further includes a plurality of transparent, relatively thin, plastic baffle members 44, one of which is seen by itself in FIG. 3.

Each baffle member 44 has a straight rear edge 46 and extends vertically within the ingress section 16. The baffle member is attached to the inner surfaces of adjoined tabs 36, 40 by the connecting screw 42 being threaded into the baffle member from the rear edge 46. With the construction of FIG. 9 the baffle would have a tight fit in slot 112. The front edge 48 curves forwardly and downwardly to a lower forwardly extending foot portion 50. The lower edge 52 curves upwardly to the bottom of the rear edge. When all baffle members are in place in the ingress section 16 the forward edges 54 of the feet portions 50 will be adjacent, and preferably abutting, each other, with the downwardly extending portions of the forward edges 48 defining a downwardly extending open area 56. Adjacent pairs of baffle members 44 define an ingress zone 58 to the trap.

The lower rim 38 of the ingress section 16 is connected to, or is an integral part of, the entrapment container 18, shown in the figures as a generally frustoconical cup having small drainage holes 60 in the bottom wall 62 thereof. If desired, the wall 62 or a lower part of the container may be made so as to be readily separable from the container or the upper part thereof to facilitate emptying or to enable the connection thereto of a larger rigid container or a flexible bag. An electric fan could be placed in the upper part of the container to allow collection of weak flying insects such as mosquitoes.

Within the container 18 there is located a removable frustoconical funnel member 64, the upper rim of which lies on the upper rim of the container 18. The funnel member 64 has a central opening 66 through which insects will pass to the container 18. The opening is sufficiently large to pass the largest insects of interest therethrough but is small enough to prevent trapped insects from easily escaping from the container 18. The container and/or the funnel could be molded using phosphorescent pigments (green) to increase trap catches through increased brightness.

The electrical aspects of the invention will now be described. Essentially, the invention includes a power source, control circuitry and a fluorescent lamp which, when lit, will attract the insects to the trap. The power source is preferably a 6 volt lantern battery (dry cell) identified by reference number 68 and located within the casing 20. Tests have shown that an alkaline lantern battery will provide up to 38 days of effective operation with the trap operating for about four hours each night.

Figure 6A:
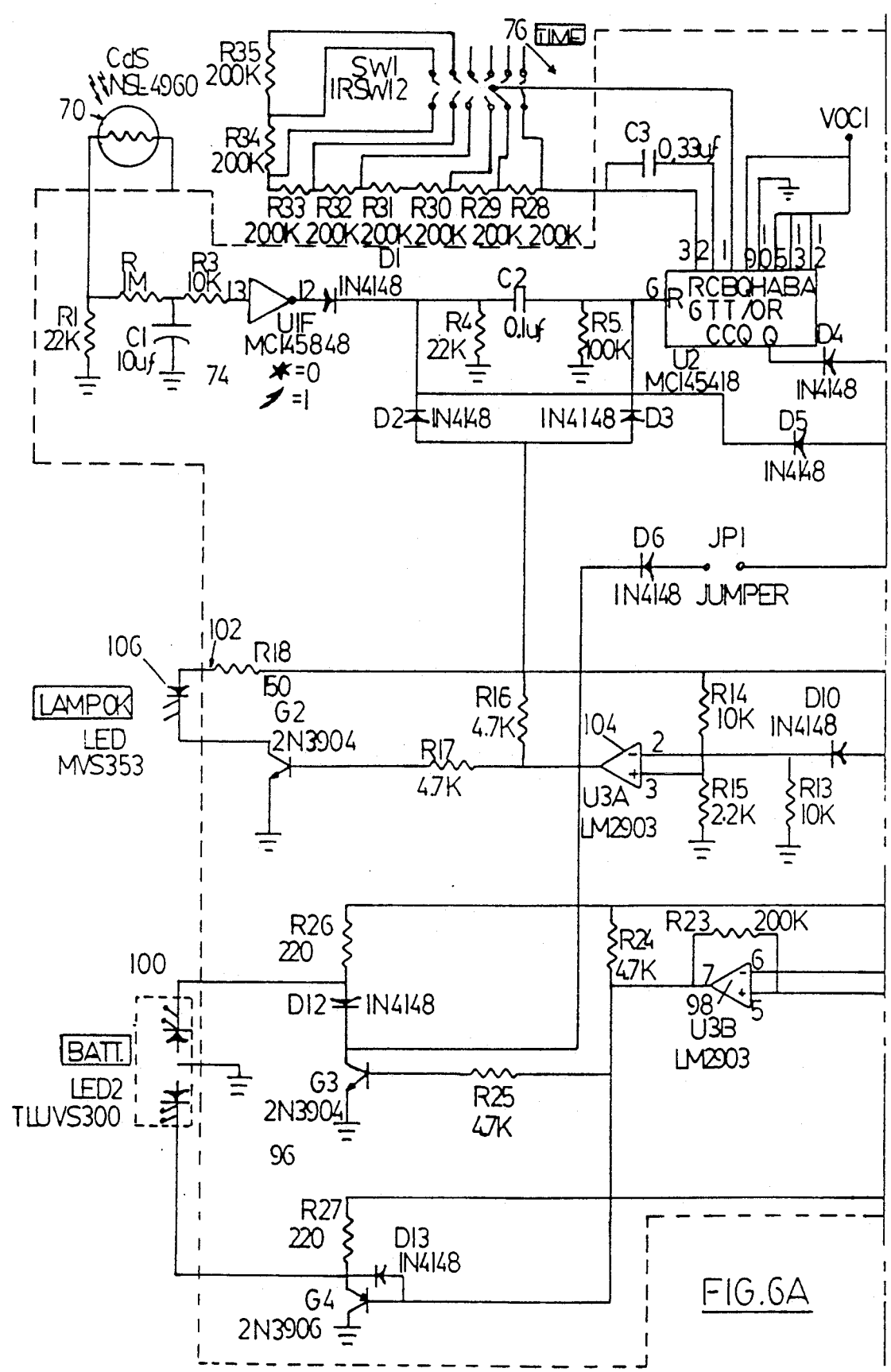
FIGS. 6A and 6B show a schematic of the complete electrical circuit.
Figure 6B:
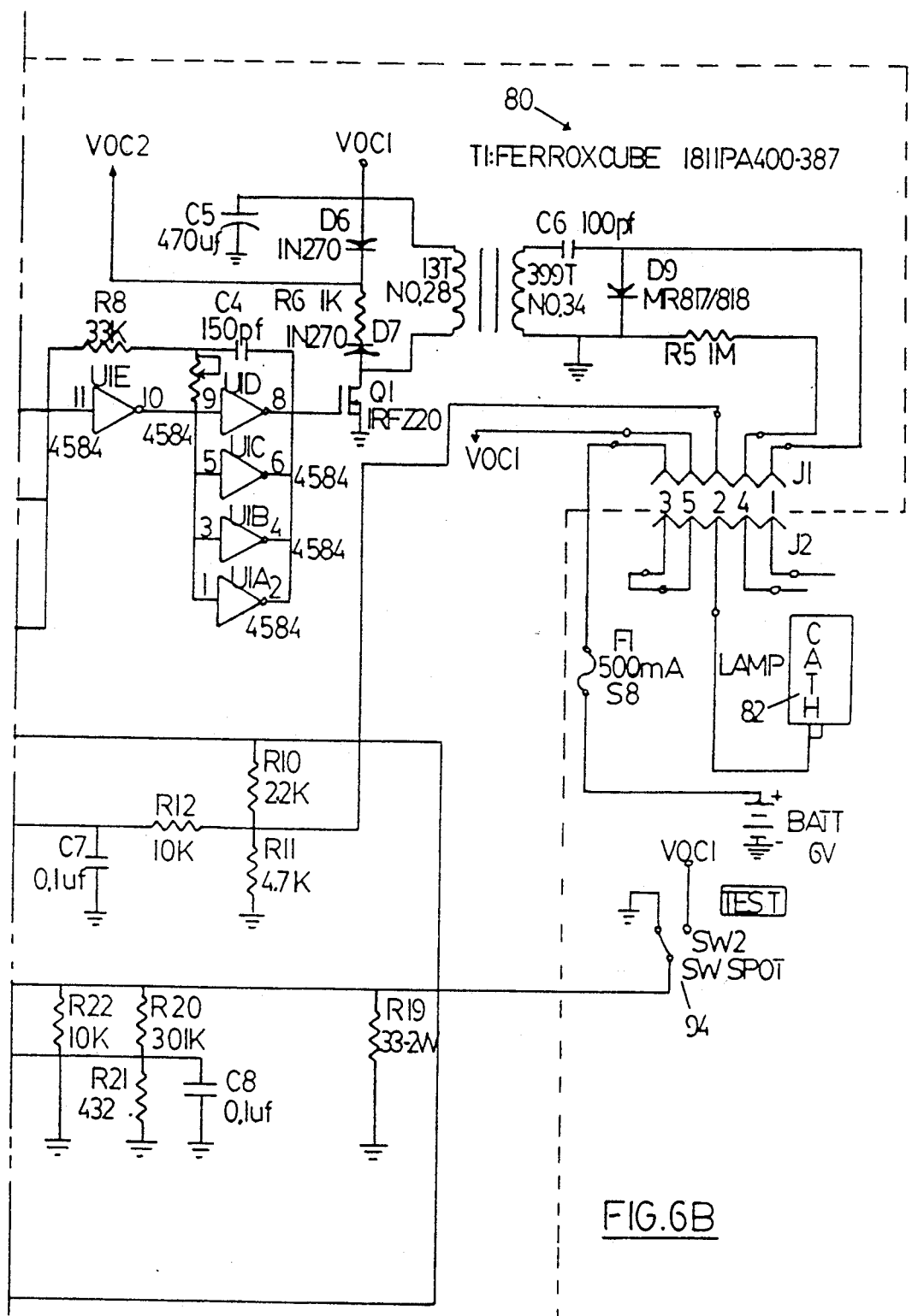

The control circuitry is depicted in FIGS. 4 to 8, with a typical schematic being illustrated in FIG. 6. Since the circuitry as seen in FIG. 6 is within the realm of a skilled electrical technician it will not be described in great detail herein. Reference will be made to the circuitry shown in FIGS. 4, 5, 7 and 8 for an overall appreciation of the operating principles and for details of specific features of the invention.

Figure 4:
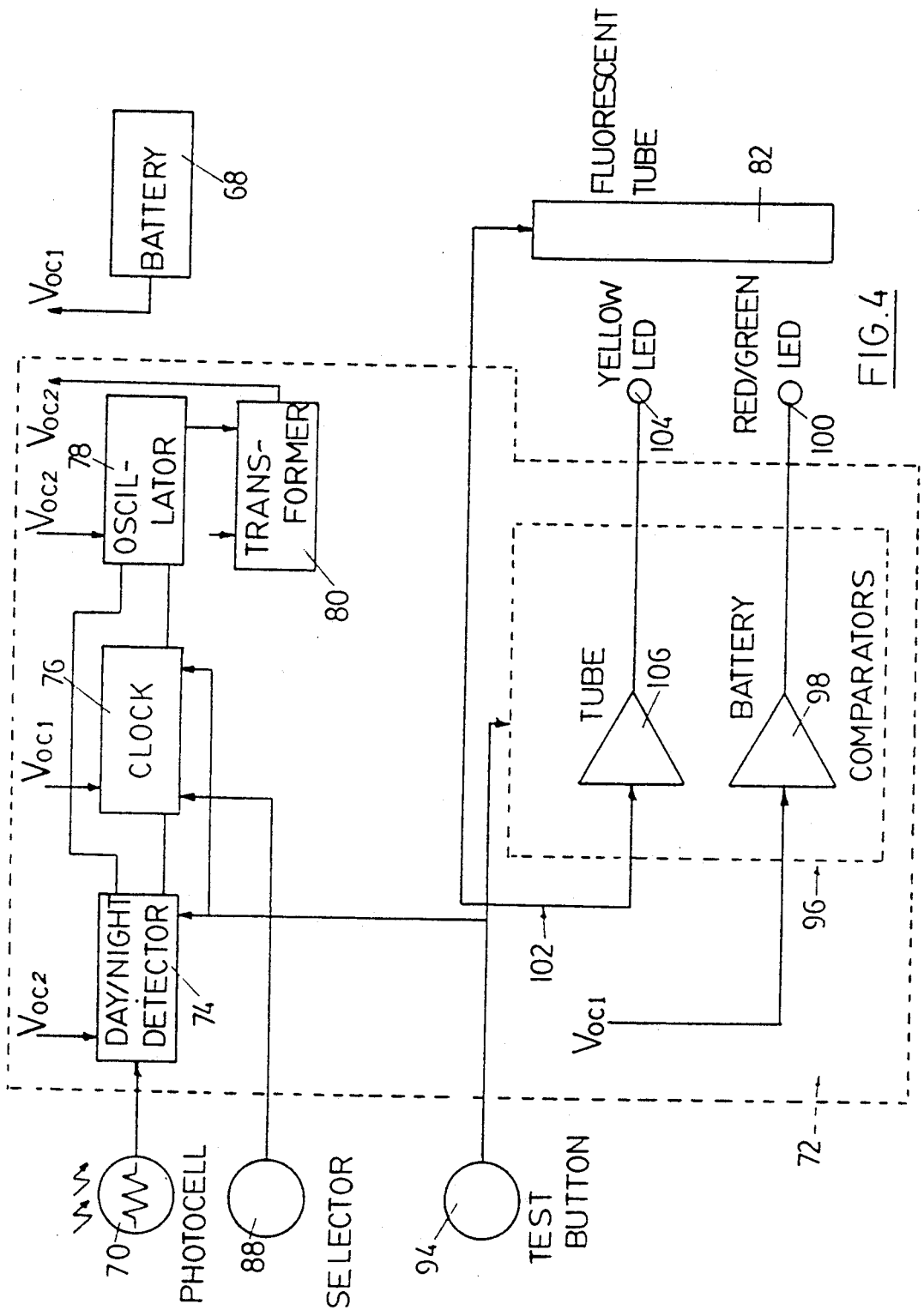
FIG. 4 is a block diagram showing operation of the electrical circuitry.

With reference to FIGS. 1, 2 and 4 it will be seen that the trap includes a photocell 70 wired into the control circuitry, all of which is mounted on a printed circuit or carrier board 72, the photocell 70 serving to activate the trap at dusk only at a certain threshold of darkness. A day/night detector 74 accepts the signal from the photocell and once the darkness threshold has passed it will activate the circuit, causing clock circuit 76 to commence operation, and oscillator 78 and transformer 80 to provide the necessary high voltage to effect start-up of a fluorescent light source 82.

Light source 82 comprises a tubular lamp, commercially available in a variety of colours. Typically it is possible to utilize miniature fluorescent lamps capable of emitting white, blue, green, or ultra violet (U.V.) light, the choice of lamp depending on the species of insect(s) to be trapped. The lamp should come with a suitable connector 84 for removable insertion into a socket 86 mounted to the board 72. As seen in FIG. 2 the elongated tubular lamp 82 depends from the board 72 and is centrally located within the ingress section 16, within the open area 56 defined by the baffle members 44.

Broken lamps can be easily replaced; lamps can be removed and protected during transportation; lamps emitting a different colour of light can be substituted; and the battery supply current goes through the socket 86 and effectively removes all power from the trap when the lamp is disconnected. The last feature prevents unwanted discharging of the battery and thus prolongs battery life.

The operating time of the trap is determined by the clock circuit 76 which starts counting once current starts flowing to the lamp 82. If desired, an eight position time selector 88 can be connected to this clock circuit, allowing the choice of eight operation times, the interval being one hour. The time selector is physically activated by depending knob 90, accessible via the ingress section 16.

When the trap is operational the lamp 82 is turned on in response to the onset of darkness as detected by the photocell 70. The lamp will stay lit for the selected period of time as determined by the clock circuit 76, shutting off at the end of the selected time interval.

While the trap is operational, light from the lamp 82 will be refracted into and diffused through the baffle members 44 so as to increase the luminescence of the trap, meaning that the lamp can be operated at minimum power. Flying insects attracted to the trap do not perceive the transparent baffle members and are stunned somewhat when they fly into a baffle member. The stunned insects stop flying and drop down to the funnel member 64 which directs them down through opening 66 into the entrapment container 18. Even if the insects recover they are impeded from escaping the container by the funnel member 64.

If the insects are to be killed then the container 18 can be provided interiorly with a suitable toxin, such as an insecticide strip 92 shown in chain-dotted lines in FIG. 2, suspended from the funnel member 64.

An auxiliary lure such as a sex-pheromone to enhance trap effectiveness may be placed next to the light source, either in the rubber envelope of the light socket or in a drop of silicone or lure holder placed under the cover 14 next to the light socket. The use of two attractants such as light and a pheromone increases trap efficacy.

Figure 7:
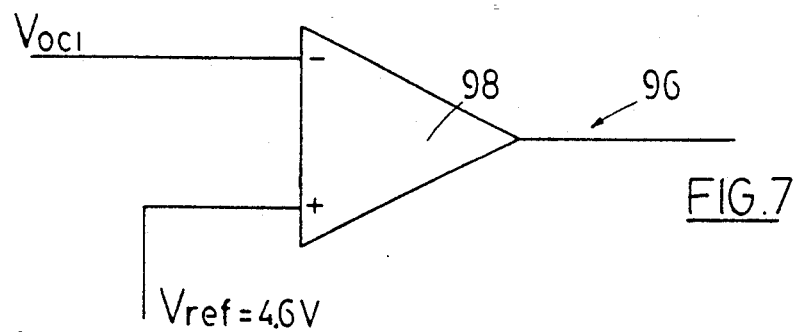
FIG. 7 shows the battery verification circuit.
Figure 8:
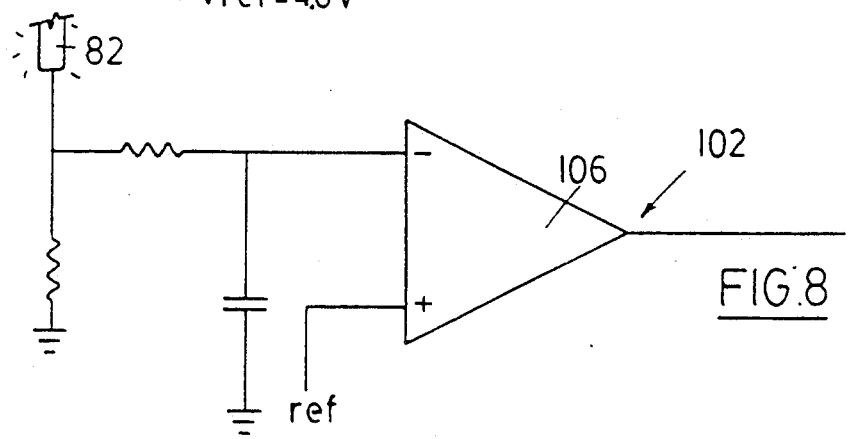
FIG. 8 shows the tube verification circuit.

FIGS. 4, 7 and 8 illustrate two optional circuits that are activated by a test button 94 (not shown in FIGS. 1 or 2) to verify the viability of the battery and the lamp. The battery verification circuit 96 connects a load resistance to the battery, and draws approximately 300 mA of current, quickly reducing the battery voltage to its real value. The real battery voltage is then compared with a reference voltage generated by a diode 98. A two colour light emitting diode (LED) 100 indicates battery state. If the battery voltage is greater or equal to 4.6 V the LED 100 will be green. This indicates that the trap can still function for up to 7 days at a rate of 4 hours per day. If battery voltage is below 4.6 V LED 100 becomes red and the minimum operation time cannot be determined. The battery should be replaced.

The tube verification circuit 102 is most useful when testing U.V. tubes or lamps, the operation of which is difficult to detect during daylight hours. Proper lamp operation is indicated by a yellow LED 104. The voltage across a resistor (FIG. 8) connected in series with the lamp 82 is measured and compared to a reference voltage by a diode 106. If the resistor voltage is higher than the reference voltage LED 104 is lit and the lamp is thus conducting.

The transformer 80 (FIG. 5) is used to provide a high voltage to operate the lamp 82. The rectifier section also provides an increased dc supply voltage to optimize operation of the transistor Q1 (FIG. 6) and the oscillator 78.

Transistor Q1 is used to amplify the 50 kHz signal that comes from the oscillator 78. This signal is used to drive the primary winding of the "pot core" low loss transformer 80. The secondary winding of this transformer is connected to a negative half wave rectifier made up of C6 and D9. The output signal of this circuit is a negative portion of a sine wave whose amplitude has been doubled. This negative signal is required to obtain maximum luminosity and longer life from the fluorescent lamp 82.

The value of capacitor C6 is chosen as a function of the Q factor of the pot core. This Q factor is greatly influenced by the material used for the core of the transformer. The calculated Q factor of the circuit is approximately 100.

The clock circuit 76 controls operation of the oscillator and the length of time that the trap is in operation. The clock timing circuit is a 4541 CMOS circuit that includes a 16 bit counter and oscillator. The input trigger is a pulse that signals the counter to start counting down. The output is at a high logic level during countdown and changes to a low level when countdown is complete. This low level stops the oscillator. Operation time is adjusted by an RC time constant that is external to the 4541 CMOS.

The oscillator section 78 allows optimization of trap efficiency. The RC circuit of the oscillator is adjusted to the resonant frequency of the transformer 80 so as to obtain minimum current for maximum light output. The resonant frequency obtained is around 50 kHz. A 4584 CMOS circuit is used as the oscillator. Several other inverters available in this circuit are used to drive the field effect transistor. A voltage doubler is used at the output of the transistor to provide higher voltage to the 4584 CMOS circuit. This further increases the efficiency of the circuit. The Schmitt trigger feature of the 4584 CMOS circuit allows good noise immunity and stabilizes the logic levels of the clock.

The day/night detector 74 keeps the trap inactive during the day and activates it at nightfall. Light furnished to the photocell 70 is converted to a voltage by a simple voltage divider. When the photocell detects a day to night transition the Schmitt trigger inverter output changes to a high logic level. This change passes through a differentiator or high pass filter and resets the clock counter to zero. The clock counter can thus start to count at a rate that is determined by the desired interval of operation. To prevent false termination of operation due to momentary illumination as caused, for example, by lightning or a flashlight, a low pass filter is added to the input of the Schmitt trigger.

Two other aspects of the invention should also be described. First of all, as seen in FIG. 2, there is provided a safety fuse and light switch intensity selector circuit 108 which serves to protect the entire circuit against a power overload and which allows one to select one of several lumination intensities for the lamp. Such circuitry is not inventive in its own right.

The other aspect to be described is the ability to use the trap of this invention to trap crawling insects. Instead of suspending the trap in the air via the hook 32 the container 18 could be buried in the ground with its upper rim essentially at ground level. Crawling insects attracted to the light would fall into the funnel 64, through the hole 66 therein, into the container 18, from which there would be no escape. If such insects were to be killed then a suitable insecticide would be provided in the container.

As alternatives to the described alkaline dry cell, power for the insect trap of this invention could be provided by a suitable AC power source. This would necessitate some changes to the circuitry, all within the realm of a competent engineer. Furthermore, battery life could be extended by using solar cells in combination with a rechargeable battery, the electricity generated by the solar cells being used to keep the battery charged.

The foregoing has described the structure, operation and electrical circuitry of the present invention. It is clear that many changes could be made to the components of the trap for the sake of convenience or ease of manufacture without departing from the spirit of the invention. Thus the protection to be afforded this invention should be determined from the scope of the claims appended hereto.

The embodiments of the invention in which an exclusive property or privilege is claimed are defined as follows:

1. A trap for flying or crawling insects comprising: upper housing means;
   a frustoconical, outwardly projecting protective roof member at a lower end of said housing means;
   an insect ingress section connected to said housing means below said roof member;
   a removable insect entrapment container connected to said ingress section therebelow;
   a frustoconical funnel member within said container at an upper end thereof so as to open downwardly into said container;
   a removable light source centrally positioned within said ingress section;
   electrical power and circuit means within said housing means for supplying electrical power to said light source; and
   a plurality of spaced apart transparent baffle members within said ingress section, each baffle member extending vertically above said funnel member from adjacent the outer edge of said ingress section to adjacent said light source, with each pair of adjacent baffle members defining an insect ingress zone.

2. The trap of claim 1 wherein said housing means comprises an annular cylindrical casing and a cup-shaped cap member removably connected to said cylindrical casing at the upper end thereof, said cap member including means for suspending said trap from a tree or the like.

3. The trap of claim 1 wherein said power means comprises a removable dry cell battery and said circuit means comprises: means for energizing and de-energizing said circuit means at preselected times; means for preventing unwanted energization of said circuit means; and means for de-energizing said circuit means during removal of said light source.

4. The trap of claim 3 wherein said circuit means may also include any or all of: means for selectively defining a time interval for energization of said circuit means; means for selectively providing different levels of energization of said light source; and means for testing and indicating the viability of said power means or said light source; and means for charging said battery.

5. The trap of claim 1 wherein said light source is selected from the group comprising blue, green, white, and U.V. fluorescent tubular lamps.

6. The trap of claim 3 wherein said means for energizing and de-energizing said circuit means includes a photocell in said circuit means for switching said circuit means on at dusk; oscillator means and transformer means for supplying a high voltage to activate said light source, and clock means for controlling the length of time that said circuit means is energized.

7. The trap of claim 6 wherein said means for preventing unwanted energization of said circuit means includes a low pass filter to which said photocell is connected to prevent false de-energization due to momentary illumination in the surrounding area.

8. The trap of claim 6 wherein said clock means is settable to maintain said circuit means energized for a selected period of time.

9. The trap of claim 3 wherein each of said baffle members is formed from thin plastic material and includes a lower inwardly projecting foot portion which lies adjacent such foot portions of the remaining baffle members below said light source.

10. The trap of claim 1 wherein said entrapment container includes a removable perforated bottom wall, and means for connecting a supplementary container thereto.

11. The trap of claim 1 including means for containing an insect lure, such as a pheromone, within said trap adjacent said light source.

12. The trap of claim 1 including means for mounting an insecticide within said container below said funnel member.

13. A trap for flying or crawling insects comprising:
   a cylindrical upper housing member removably connected to an upper cover member;
   a frustoconical, outwardly projecting protective roof member at a lower end of said housing member;
   an insect ingress section connected to said housing member below said roof member;
   a removable insect entrapment container connected to said ingress section therebelow;
   a frustoconical funnel member within said container at an upper end thereof and opening downwardly into said container;
   dry cell battery means within said housing member;
   electrical circuit means within said housing member and selectively connectable to said battery means;
   a tubular removable fluorescent lamp connected to said circuit means and suspended therebelow so as to be positioned centrally within said ingress section;
   photocell means connected to said circuit means for energizing said circuit means and said lamp at a predetermined threshold of darkness;
   clock means connected to said circuit means for controlling the length of time that said circuit means is energized; and
   a plurality of spaced apart transparent baffle members within said ingress section, each baffle member extending vertically above said funnel member from adjacent the outer edge of said ingress section to adjacent said tubular lamp, with each pair of adjacent baffle members defining an insect ingress zone to said trap.

* * * * *

UNITED STATES PATENT AND TRADEMARK OFFICE
CERTIFICATE OF CORRECTION

PATENT NO. : 5,301,456
DATED : April 12, 1994
INVENTOR(S) : Luc JOBIN and Charles COULOMBE It is certified that error appears in the above-identified patent and that said Letters Patent is hereby corrected as shown below:

On the Title page,

Please show the assignee as follows:

item [73] Assignee: Her Majesty The Queen In Right Of Canada
As Represented By The Minister Of Forestry,
Hull, Quebec, Canada.

Signed and Sealed this

Twentieth Day of September, 1994

Attest:

BRUCE LEHMAN

*Attesting Officer*      *Commissioner of Patents and Trademarks*